United States Patent
Kothe et al.

(10) Patent No.: US 9,898,552 B2
(45) Date of Patent: Feb. 20, 2018

(54) SYSTEM FOR REFINING COGNITIVE INSIGHTS USING TRAVEL-RELATED COGNITIVE GRAPH VECTORS

(71) Applicant: WayBlazer, Inc., Austin, TX (US)

(72) Inventors: Kyle W. Kothe, Austin, TX (US); Scott E. Goldberg, Venice, CA (US); John N. Faith, Austin, TX (US)

(73) Assignee: Wayblazer, Inc., Austin, TX (US)

( * ) Notice: Subject to any disclaimer, the term of this patent is extended or adjusted under 35 U.S.C. 154(b) by 244 days.

(21) Appl. No.: 14/733,248

(22) Filed: Jun. 8, 2015

(65) Prior Publication Data
US 2015/0356201 A1    Dec. 10, 2015

Related U.S. Application Data

(60) Provisional application No. 62/009,626, filed on Jun. 9, 2014, provisional application No. 62/091,146, filed on Dec. 12, 2014.

(51) Int. Cl.
*G06F 17/00* (2006.01)
*G06F 17/30* (2006.01)

(52) U.S. Cl.
CPC .. *G06F 17/30958* (2013.01); *G06F 17/30324* (2013.01)

(58) Field of Classification Search
CPC .... G06F 17/30; G06F 17/00; G06F 17/30958; G06F 17/30324
USPC ................................................. 707/600–899
See application file for complete search history.

(56) References Cited

U.S. PATENT DOCUMENTS

| | | |
|---|---|---|
| 7,730,085 B2 | 6/2010 | Hassan et al. |
| 9,514,418 B2 | 12/2016 | Sanchez |
| 9,665,825 B2 | 5/2017 | Sanchez |
| 2002/0091736 A1 | 7/2002 | Wall |
| 2002/0147619 A1 | 10/2002 | Floss et al. |
| 2003/0101036 A1* | 5/2003 | Nagel ............... G01C 21/32 703/13 |
| 2003/0191608 A1 | 10/2003 | Anderson et al. |
| 2007/0124291 A1 | 5/2007 | Hassan et al. |
| 2010/0042401 A1 | 2/2010 | Ascoli et al. |
| 2011/0258049 A1 | 10/2011 | Ramer et al. |
| 2012/0102050 A1 | 4/2012 | Button et al. |
| 2013/0046795 A1 | 2/2013 | Borgerson et al. |
| 2013/0282485 A1 | 10/2013 | Barsoba et al. |
| 2014/0188462 A1 | 7/2014 | Zadeh |
| 2015/0012467 A1 | 1/2015 | Greystoke et al. |
| 2015/0032366 A1 | 1/2015 | Man et al. |
| 2015/0294216 A1 | 10/2015 | Baughman et al. |
| 2015/0317337 A1 | 11/2015 | Edgar |
| 2015/0356168 A1 | 12/2015 | Kothe et al. |
| 2015/0356404 A1 | 12/2015 | Sanchez et al. |
| 2015/0356407 A1 | 12/2015 | Faith et al. |
| 2015/0356408 A1 | 12/2015 | Faith et al. |
| 2015/0356409 A1 | 12/2015 | Faith et al. |

(Continued)

OTHER PUBLICATIONS

Office Action issued for U.S. Appl. No. 14/629,737, dated Jun. 3, 2016, 11 pages.

(Continued)

*Primary Examiner* — Isaac M Woo
(74) *Attorney, Agent, or Firm* — Sprinkle IP Law Group

(57) ABSTRACT

A method, system and computer-usable medium are disclosed for using travel-related cognitive graph vectors.

19 Claims, 10 Drawing Sheets

(56) References Cited

U.S. PATENT DOCUMENTS

| | | |
|---|---|---|
| 2015/0356410 A1 | 12/2015 | Faith et al. |
| 2015/0356411 A1 | 12/2015 | Faith et al. |
| 2015/0356412 A1 | 12/2015 | Faith et al. |
| 2015/0356416 A1 | 12/2015 | Faith et al. |
| 2015/0356417 A1 | 12/2015 | Faith et al. |
| 2015/0356422 A1 | 12/2015 | Sanchez et al. |
| 2015/0356439 A1 | 12/2015 | Faith et al. |
| 2015/0356440 A1 | 12/2015 | Faith et al. |
| 2015/0356441 A1 | 12/2015 | Faith et al. |
| 2016/0140236 A1 | 5/2016 | Estes |
| 2016/0285999 A1 | 9/2016 | Koonce et al. |

OTHER PUBLICATIONS

Office Action issued for U.S. Appl. No. 14/629,740, dated Jan. 22, 2016, 13 pages.

Office Action issued for U.S. Appl. No. 14/731,881, dated Sep. 1, 2017, 31 pages.

Office Action issued for U.S. Appl. No. 14/731,844, dated Sep. 5, 2017, 20 pages.

Parate et al., Leveraging Graphical Models to Improve Accuracy and Reduce Privacy Risks of Mobile Sensing, MobiSys'13, Jun. 25-28, 2013, pp. 83-95.

Office Action issued for U.S. Appl. No. 14/731,868, dated Sep. 18, 2017, 17 pages.

Aquino, Jr. et al., User Modeling with Personas, CLIHC'05, Oct. 23-26, 2005, pp. 277-282.

Li et al., A Semantics-based Approach to Large-Scale Mobile Social Networking, Mobile Netw Appl (2012) 17:192-205, Jun. 14, 2011, Springer Science+Business Media, LLC, pp. 192-205.

Calegari et al., Personal ontologies: Generation of user profiles based on the Yago ontology, Information Processing and Management 49 (2013), Elsevier Ltd., pp. 640-658.

Office Action issued for U.S. Appl. No. 14/629,604, dated Feb. 14, 2017, 29 pages.

Gubbi et al., Internet of Things (loT): A Vision, Architectural Elements, and Future Directions, Future Generation Computer Systems 29.7 (2013), pp. 1-19.

Haigh et al, Can Artificial Intelligence meet the Cognitive Networking Challenge?, submitted to EURASIP Journal on Wireless Communications and Networking, May, 2011.

Köpcke et al., Frameworks for Entity Matching: A Comparison, Data & Knowledge Engineering 69 (2010), Elsevier B.V., pp. 197-210.

Office Action issued for U.S. Appl. No. 14/629,604, dated Jun. 28, 2017, 25 pages.

Wu et al., Towards a Cloud-Based Design and Manufacturing Paradigm: Looking Backward, Looking Forward, Proceedings of the ASME 2012 International Design Engineering Technical Conference & Computers and Information in Engineering Conference, Aug. 12-15, 2012, American Society of Mechanical Engineers (ASME), pp. 1-14.

Action issued for U.S. Appl. No. 14/629,608, dated May 10, 2017, 31 pages.

Office Action issued for U.S. Appl. No. 14/733,255, dated Aug. 21, 2017, 11 pages.

Office Action issued for U.S. Appl. No. 14/731,890, dated Sep. 20, 2017, 22 pages.

Office Action issued for U.S. Appl. No. 14/731,900, dated Oct. 2, 2017, 20 pages.

Office Action issued for U.S. Appl. No. 14/731,883, dated Sep. 28, 2017, 19 pages.

Office Action issued for U.S. Appl. No. 14/731,839, dated Dec. 26, 2017, 17 pages.

Office Action issued for U.S. Appl. No. 14/731,904, dated Dec. 28, 2017, 18 pages.

\* cited by examiner

SYSTEM FOR REFINING COGNITIVE INSIGHTS USING TRAVEL-RELATED COGNITIVE GRAPH VECTORS

CROSS-REFERENCE TO RELATED APPLICATION

This application claims the benefit under 35 U.S.C. § 119(e) of U.S. Provisional Application No. 62/009,626, filed Jun. 9, 2014, entitled "Cognitive Information Processing System Environment," and U.S. Provisional Application No. 62/091,146, filed Dec. 12, 2014, entitled "System for Refining Cognitive Insights Using Travel-Related Cognitive Graph Vectors." U.S. Provisional Application Nos. 62/009,626 and 62/091,146 include exemplary systems and methods and are incorporated by reference in their entireties.

BACKGROUND OF THE INVENTION

Field of the Invention

The present invention relates in general to the field of computers and similar technologies, and in particular to software utilized in this field. Still more particularly, it relates to a system and computer-usable medium for using travel-related cognitive graph vectors.

Description of the Related Art

In general, "big data" refers to a collection of datasets so large and complex that they become difficult to process using typical database management tools and traditional data processing approaches. These datasets can originate from a wide variety of sources, including computer systems, mobile devices, credit card transactions, television broadcasts, and medical equipment, as well as infrastructures associated with cities, sensor-equipped buildings and factories, and transportation systems. Challenges commonly associated with big data, which may be a combination of structured, unstructured, and semi-structured data, include its capture, curation, storage, search, sharing, analysis and visualization. In combination, these challenges make it difficult to efficiently process large quantities of data within tolerable time intervals.

Nonetheless, big data analytics hold the promise of extracting insights by uncovering difficult-to-discover patterns and connections, as well as providing assistance in making complex decisions by analyzing different and potentially conflicting options. As such, individuals and organizations alike can be provided new opportunities to innovate, compete, and capture value.

One aspect of big data is "dark data," which generally refers to data that is either not collected, neglected, or underutilized. Examples of data that is not currently being collected includes location data prior to the emergence of companies such as Foursquare or social data prior to the advent companies such as Facebook. An example of data that is being collected, but is difficult to access at the right time and place, includes data associated with the side effects of certain spider bites while on a camping trip. As another example, data that is collected and available, but has not yet been productized of fully utilized, may include disease insights from population-wide healthcare records and social media feeds. As a result, a case can be made that dark data may in fact be of higher value than big data in general, especially as it can likely provide actionable insights when it is combined with readily-available data.

SUMMARY OF THE INVENTION

A system and computer-usable medium are disclosed for using travel-related cognitive graph vectors.

More specifically, in one embodiment, the invention relates to a system comprising: a processor; a data bus coupled to the processor; and a computer-usable medium embodying computer program code, the computer-usable medium being coupled to the data bus. The computer program code is used for refining cognitive insights using cognitive graph vectors and comprises instructions executable by the processor and configured for: storing travel-related data from a plurality of data sources within a cognitive graph; associating a first set of the travel-related data within the cognitive graph with a first travel-related cognitive graph vector of a plurality of travel-related cognitive graph vectors; associating a second set of the travel-related data within the cognitive graph with a second travel-related cognitive graph vector of the plurality of travel-related cognitive graph vectors; processing the travel-related data from the plurality of data sources to provide travel-related cognitive insights; and refining the travel-related cognitive insights based upon a limitation relating to one of the plurality of travel-related cognitive graph vectors.

In another embodiment, the invention relates to a non-transitory, computer-readable storage medium embodying computer program code, the computer program code comprising computer executable instructions configured for: storing travel-related data from a plurality of data sources within a cognitive graph; associating a first set of the travel-related data within the cognitive graph with a first travel-related cognitive graph vector of a plurality of travel-related cognitive graph vectors; associating a second set of the travel-related data within the cognitive graph with a second travel-related cognitive graph vector of the plurality of travel-related cognitive graph vectors; processing the travel-related data from the plurality of data sources to provide travel-related cognitive insights; and refining the travel-related cognitive insights based upon a limitation relating to one of the plurality of travel-related cognitive graph vectors.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
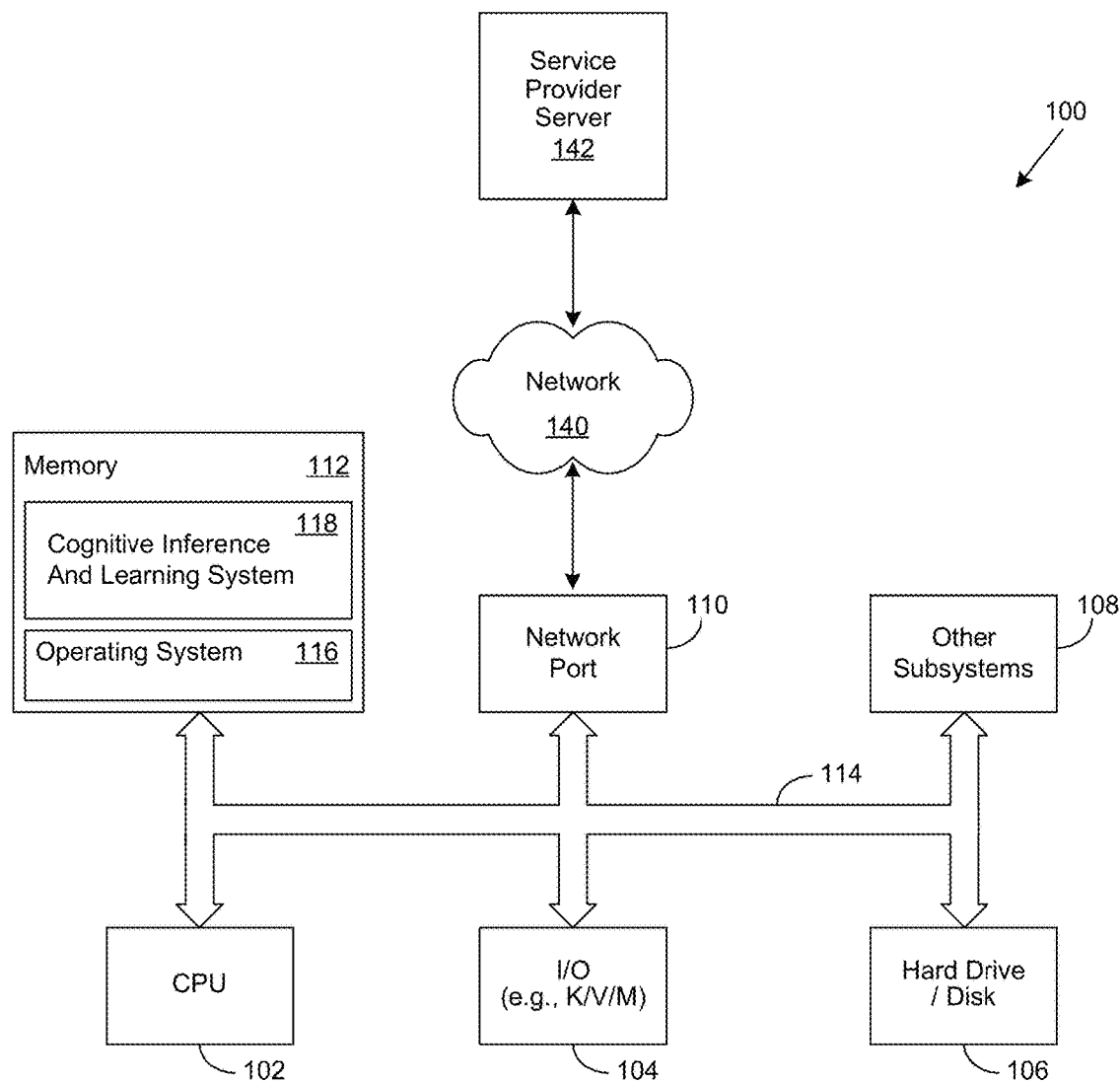
FIG. 1 depicts an exemplary client computer in which the present invention may be implemented.

A method, system and computer-usable medium are disclosed for using travel-related cognitive graph (CG) vectors. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disc (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a generalized illustration of an information processing system 100 that can be used to implement the system and method of the present invention. The information processing system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information processing system 100 also includes network port 110 operable to connect to a network 140, which is likewise accessible by a service provider server 142. The information processing system 100 likewise includes system memory 112, which is interconnected to the foregoing via one or more buses 114. System memory 112 further comprises operating system (OS) 116 and in various embodiments may also comprise cognitive inference and learning system (CILS) 118. In these and other embodiments, the CILS 118 may likewise comprise invention modules 120. In one embodiment, the information processing system 100 is able to download the CILS 118 from the service provider server 142. In another embodiment, the CILS 118 is provided as a service from the service provider server 142.

In various embodiments, the CILS 118 is implemented to perform various cognitive computing operations described in greater detail herein. As used herein, cognitive computing broadly refers to a class of computing involving self-learning systems that use techniques such as spatial navigation, machine vision, and pattern recognition to increasingly mimic the way the human brain works. To be more specific, earlier approaches to computing typically solved problems by executing a set of instructions codified within software. In contrast, cognitive computing approaches are data-driven, sense-making, insight-extracting, problem-solving systems that have more in common with the structure of the human brain than with the architecture of contemporary, instruction-driven computers.

To further differentiate these distinctions, traditional computers must first be programmed by humans to perform specific tasks, while cognitive systems learn from their interactions with data and humans alike, and in a sense, program themselves to perform new tasks. To summarize the difference between the two, traditional computers are designed to calculate rapidly. Cognitive systems are designed to quickly draw inferences from data and gain new knowledge.

Cognitive systems achieve these abilities by combining various aspects of artificial intelligence, natural language processing, dynamic learning, and hypothesis generation to render vast quantities of intelligible data to assist humans in making better decisions. As such, cognitive systems can be characterized as having the ability to interact naturally with people to extend what either humans, or machines, could do on their own. Furthermore, they are typically able to process natural language, multi-structured data, and experience much in the same way as humans. Moreover, they are also typically able to learn a knowledge domain based upon the best available data and get better, and more immersive, over time.

It will be appreciated that more data is currently being produced every day than was recently produced by human beings from the beginning of recorded time. Deep within this ever-growing mass of data is a class of data known as "dark data," which includes neglected information, ambient signals, and insights that can assist organizations and individuals in augmenting their intelligence and deliver actionable insights through the implementation of cognitive applications. As used herein, cognitive applications, or "cognitive apps," broadly refer to cloud-based, big data interpretive applications that learn from user engagement and data interactions. Such cognitive applications extract patterns and insights from dark data sources that are currently almost completely opaque. Examples of such dark data include disease insights from population-wide healthcare records and social media feeds, or new sources of information, such as sensors monitoring pollution in delicate marine environments.

Over time, it is anticipated that cognitive applications will fundamentally change the ways in which many organizations operate as they invert current issues associated with data volume and variety to enable a smart, interactive data supply chain. Ultimately, cognitive applications hold the promise of receiving a user query and immediately providing a data-driven answer from a masked data supply chain in response. As they evolve, it is likewise anticipated that cognitive applications may enable a new class of "sixth sense" applications that intelligently detect and learn from relevant data and events to offer insights, predictions and advice rather than wait for commands. Just as web and mobile applications changed the way people access data, cognitive applications may change the way people listen to, and become empowered by, multi-structured data such as emails, social media feeds, doctors notes, transaction records, and call logs.

However, the evolution of such cognitive applications has associated challenges, such as how to detect events, ideas, images, and other content that may be of interest. For example, assuming that the role and preferences of a given user are known, how is the most relevant information discovered, prioritized, and summarized from large streams of multi-structured data such as news feeds, blogs, social media, structured data, and various knowledge bases? To further the example, what can a healthcare executive be told about their competitor's market share? Other challenges include the creation of a contextually-appropriate visual summary of responses to questions or queries.

Figure 2:
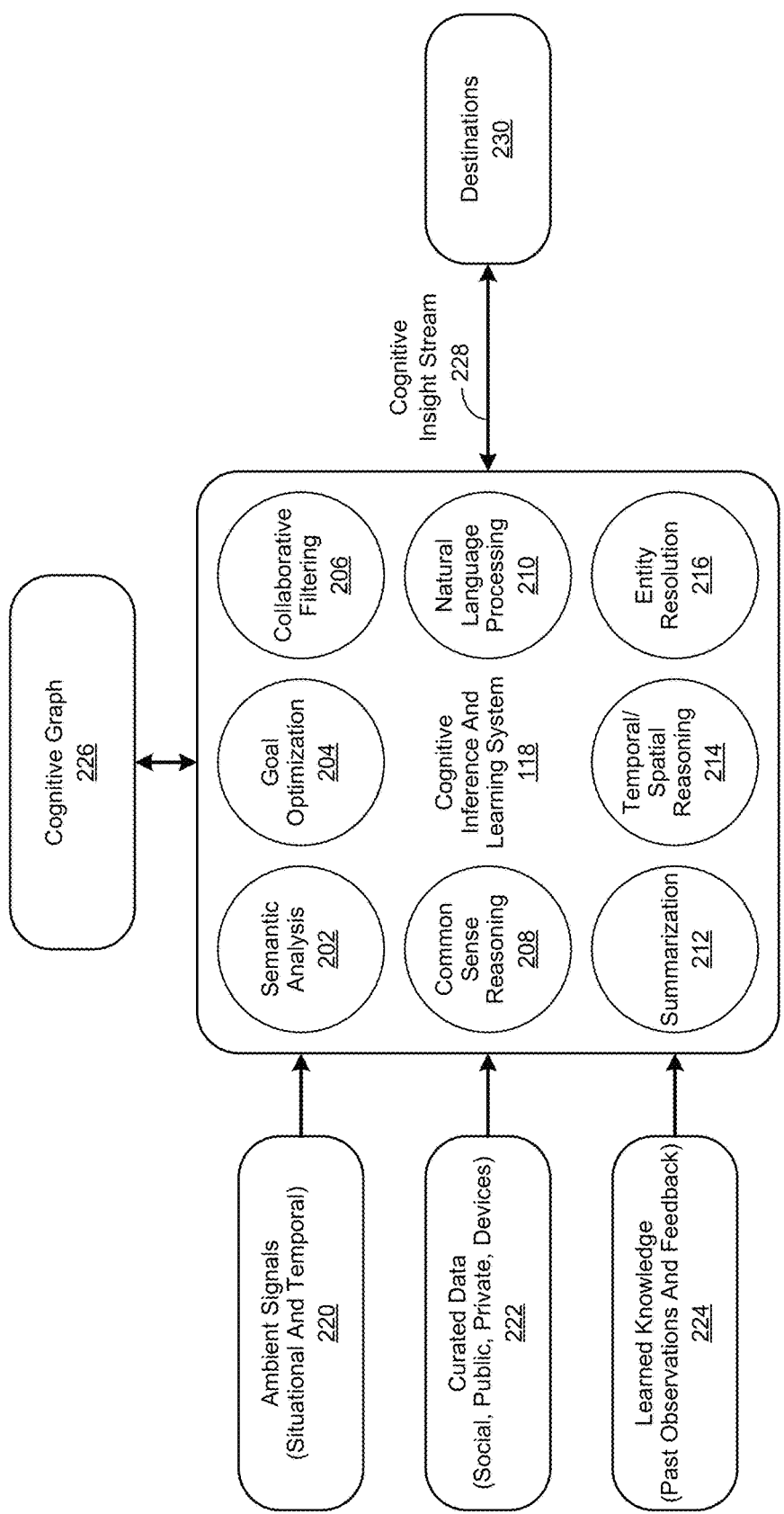
FIG. 2 is a simplified block diagram of a cognitive inference and learning system (CILS)

FIG. 2 is a simplified block diagram of a CILS implemented in accordance with an embodiment of the invention. In various embodiments, the CILS 118 is implemented to incorporate a variety of processes, including semantic analysis 202, goal optimization 204, collaborative filtering 206, common sense reasoning 208, natural language processing 210, summarization 212, temporal/spatial reasoning 214, and entity resolution 216 to generate cognitive insights.

As used herein, semantic analysis 202 broadly refers to performing various analysis operations to achieve a semantic level of understanding about language by relating syntactic structures. In various embodiments, various syntactic structures are related from the levels of phrases, clauses, sentences and paragraphs, to the level of the body of content as a whole and to its language-independent meaning. In certain embodiments, the semantic analysis 202 process includes processing a target sentence to parse it into its individual parts of speech, tag sentence elements that are related to predetermined items of interest, identify dependencies between individual words, and perform co-reference resolution. For example, if a sentence states that the author really likes the hamburgers served by a particular restaurant, then the name of the "particular restaurant" is co-referenced to "hamburgers."

As likewise used herein, goal optimization 204 broadly refers to performing multi-criteria decision making operations to achieve a given goal or target objective. In various embodiments, one or more goal optimization 204 processes are implemented by the CILS 118 to define predetermined goals, which in turn contribute to the generation of a cognitive insight. For example, goals for planning a vacation trip may include low cost (e.g., transportation and accommodations), location (e.g., by the beach), and speed (e.g., short travel time). In this example, it will be appreciated that certain goals may be in conflict with another. As a result, a cognitive insight provided by the CILS 118 to a traveler may indicate that hotel accommodations by a beach may cost more than they care to spend.

Collaborative filtering 206, as used herein, broadly refers to the process of filtering for information or patterns through the collaborative involvement of multiple agents, viewpoints, data sources, and so forth. The application of such collaborative filtering 206 processes typically involves very large and different kinds of data sets, including sensing and monitoring data, financial data, and user data of various kinds. Collaborative filtering 206 may also refer to the process of making automatic predictions associated with predetermined interests of a user by collecting preferences or other information from many users. For example, if person 'A' has the same opinion as a person 'B' for a given issue 'x', then an assertion can be made that person 'A' is more likely to have the same opinion as person 'B' opinion on a different issue 'y' than to have the same opinion on issue 'y' as a randomly chosen person. In various embodiments, the collaborative filtering 206 process is implemented with various recommendation engines familiar to those of skill in the art to make recommendations.

As used herein, common sense reasoning 208 broadly refers to simulating the human ability to make deductions from common facts they inherently know. Such deductions may be made from inherent knowledge about the physical properties, purpose, intentions and possible behavior of ordinary things, such as people, animals, objects, devices, and so on. In various embodiments, common sense reasoning 208 processes are implemented to assist the CILS 118 in understanding and disambiguating words within a predetermined context. In certain embodiments, the common sense reasoning 208 processes are implemented to allow the CILS 118 to generate text or phrases related to a target word or phrase to perform deeper searches for the same terms. It will be appreciated that if the context of a word is better understood, then a common sense understanding of the word can then be used to assist in finding better or more accurate information. In certain embodiments, this better or more accurate understanding of the context of a word, and its related information, allows the CILS 118 to make more accurate deductions, which are in turn used to generate cognitive insights.

As likewise used herein, natural language processing (NLP) 210 broadly refers to interactions with a system, such as the CILS 118, through the use of human, or natural, languages. In various embodiments, various NLP 210 processes are implemented by the CILS 118 to achieve natural language understanding, which enables it to not only derive meaning from human or natural language input, but to also generate natural language output.

Summarization 212, as used herein, broadly refers to processing a set of information, organizing and ranking it, and then generating a corresponding summary. As an example, a news article may be processed to identify its primary topic and associated observations, which are then extracted, ranked, and then presented to the user. As another example, summarization operations may be performed on the same news article to identify individual sentences, rank them, order them, and determine which of the sentences are most impactful in describing the article and its content. As yet another example, a structured data record, such as a patient's electronic medical record (EMR), may be processed using the summarization 212 process to generate sentences and phrases that describes the content of the EMR. In various embodiments, various summarization 212 processes are implemented by the CILS 118 to generate summarizations of content streams, which are in turn used to generate cognitive insights.

As used herein, temporal/spatial reasoning 214 broadly refers to reasoning based upon qualitative abstractions of temporal and spatial aspects of common sense knowledge, derived from common sense reasoning processes described in greater detail herein. For example, it is not uncommon for a predetermined set of data to change due to an associated change in time or location. Likewise, other attributes, such as its associated metadata, may likewise change due to an associated change in time or location. As a result, these changes may affect the context of the data. To further the example, the context of asking someone what they believe they should be doing at 3:00 in the afternoon during the workday while they are in their office at work may be quite different than asking the same user the same question at 3:00 on a Sunday afternoon when they are relaxing at home in their living room. In various embodiments, various temporal/spatial reasoning 214 processes are implemented by the CILS 118 to determine the context of queries, and associated data, which are in turn used to generate cognitive insights.

As likewise used herein, entity resolution 216 broadly refers to the process of finding elements in a set of data that refer to the same entity across different data sources (e.g., structured, non-structured, streams, devices, etc.), where the target entity does not share a common identifier. In various embodiments, the entity resolution 216 process is implemented by the CILS 118 to identify significant nouns, adjectives, phrases or sentence elements that represent various predetermined entities within one or more domains. From the foregoing, it will be appreciated that the implementation of one or more of the semantic analysis 202, goal optimization 204, collaborative filtering 206, common sense reasoning 208, natural language processing 210, summarization 212, temporal/spatial reasoning 214, and entity resolution 216 processes by the CILS 118 can facilitate the generation of a semantic, cognitive model.

In various embodiments, the CILS 118 receives ambient signals 220, curated data 222, and learned knowledge, which is then processed by the CILS 118 to generate one or more cognitive graphs 226. In turn, the one or more cognitive graphs 226 are further used by the CILS 118 to generate cognitive insight streams, which are then delivered to one or more destinations 230, as described in greater detail herein. In various embodiments, the destination may include a cognitive application, likewise described in greater detail herein.

As used herein, ambient signals 220 broadly refer to input signals, or other data streams, that may contain data providing additional insight or context to the curated data 222 and learned knowledge 224 received by the CILS 118. For example, ambient signals may allow the CILS 118 to understand that a user is currently using their mobile device, at location 'x', at time 'y', doing activity 'z'. To further the example, there is a difference between the user using their mobile device while they are on an airplane versus using their mobile device after landing at an airport and walking between one terminal and another. To extend the example even further, ambient signals may add additional context, such as the user is in the middle of a three leg trip and has two hours before their next flight. Further, they may be in terminal A1, but their next flight is out of C1, it is lunchtime, and they want to know the best place to eat. Given the available time the user has, their current location, restaurants that are proximate to their predicted route, and other factors such as food preferences, the CILS 118 can perform various cognitive operations and provide a recommendation for where the user can eat.

In various embodiments, the curated data 222 may include structured, unstructured, social, public, private, streaming, device or other types of data described in greater detail herein. In certain embodiments, the learned knowledge 224 is based upon past observations and feedback from the presentation of prior cognitive insight streams and recommendations. In various embodiments, the learned knowledge 224 is provided via a feedback look that provides the learned knowledge 224 in the form of a learning stream of data.

As likewise used herein, a cognitive graph 226 refers to a representation of expert knowledge, associated with individuals and groups over a period of time, to depict relationships between people, places, and things using words, ideas, audio and images. As such, it is a machine-readable formalism for knowledge representation that provides a common framework allowing data and knowledge to be shared and reused across user, application, organization, and community boundaries.

In various embodiments, the information contained in, and referenced by, a cognitive graph 226 is derived from many sources (e.g., public, private, social, device), such as curated data 222. In certain of these embodiments, the cognitive graph 226 assists in the identification and organization of information associated with how people, places and things are related to one other. In various embodiments, the cognitive graph 226 enables automated cognitive agents, described in greater detail herein, to access the Web more intelligently, enumerate inferences through utilization of curated, structured data 222, and provide answers to questions by serving as a computational knowledge engine.

In certain embodiments, the cognitive graph 226 not only elicits and maps expert knowledge by deriving associations from data, it also renders higher level insights and accounts for knowledge creation through collaborative knowledge modeling. In various embodiments, the cognitive graph 226 is a machine-readable, declarative memory system that stores and learns both episodic memory (e.g., specific personal experiences associated with an individual or entity), and semantic memory, which stores factual information (e.g., geo location of an airport or restaurant).

For example, the cognitive graph 226 may know that a given airport is a place, and that there is a list of related places such as hotels, restaurants and departure gates. Furthermore, the cognitive graph 226 may know that people such as business travelers, families and college students use the airport to board flights from various carriers, eat at various restaurants, or shop at certain retail stores. The cognitive graph 226 may also have knowledge about the key attributes from various retail rating sites that travelers have used to describe the food and their experience at various venues in the airport over the past six months.

In certain embodiments, the cognitive insight stream 228 is bidirectional, and supports flows of information both to and from destinations 230. In these embodiments, the first flow is generated in response to receiving a query, and subsequently delivered to one or more destinations 230. The second flow is generated in response to detecting information about a user of one or more of the destinations 230. Such use results in the provision of information to the CILS 118. In response, the CILS 118 processes that information, in the context of what it knows about the user, and provides additional information to the user, such as a recommendation. In various embodiments, the cognitive insight stream 228 is configured to be provided in a "push" stream configuration familiar to those of skill in the art. In certain embodiments, the cognitive insight stream 228 is implemented to use natural language approaches familiar to skilled practitioners of the art to support interactions with a user. In various embodiments, the destinations 230 include a cognitive application used by such a user.

In various embodiments, the cognitive insight stream 228 may include a stream of visualized insights. As used herein, visualized insights broadly refer to cognitive insights that are presented in a visual manner, such as a map, an infographic, images, and so forth. In certain embodiments, these visualized insights may include various cognitive insights, such as "What happened?", "What do I know about it?", "What is likely to happen next?", or "What should I do about it?" In these embodiments, the cognitive insight stream is generated by various cognitive agents, which are applied to various sources, datasets, and cognitive graphs. As used herein, a cognitive agent broadly refers to a computer program that performs a task with minimum specific directions from users and learns from each interaction with data and human users.

In various embodiments, the CILS 118 delivers Cognition as a Service (CaaS). As such, it provides a cloud-based development and execution platform that allow various cognitive applications and services to function more intelligently and intuitively. In certain embodiments, cognitive applications powered by the CILS 118 are able to think and interact with users as intelligent virtual assistants. As a result, users are able to interact with such cognitive applications by asking them questions and giving them commands. In response, these cognitive applications will be able to assist the user in completing tasks and managing their work more efficiently.

In these and other embodiments, the CILS 118 can operate as an analytics platform to process big data, and dark data as well, to provide data analytics through a public, private or hybrid cloud environment. As used herein, cloud analytics broadly refers to a service model wherein data sources, data models, processing applications, computing power, analytic models, and sharing or storage of results are implemented within a cloud environment to perform one or more aspects of analytics.

In various embodiments, users submit queries and computation requests in a natural language format to the CILS 118. In response, they are provided with a ranked list of relevant answers and aggregated information with useful links and pertinent visualizations through a graphical representation. In these embodiments, the cognitive graph 226 generates semantic and temporal maps to reflect the organization of unstructured data and to facilitate meaningful learning from potentially millions of lines of text, much in the same way as arbitrary syllables strung together create meaning through the concept of language.

Figure 3:
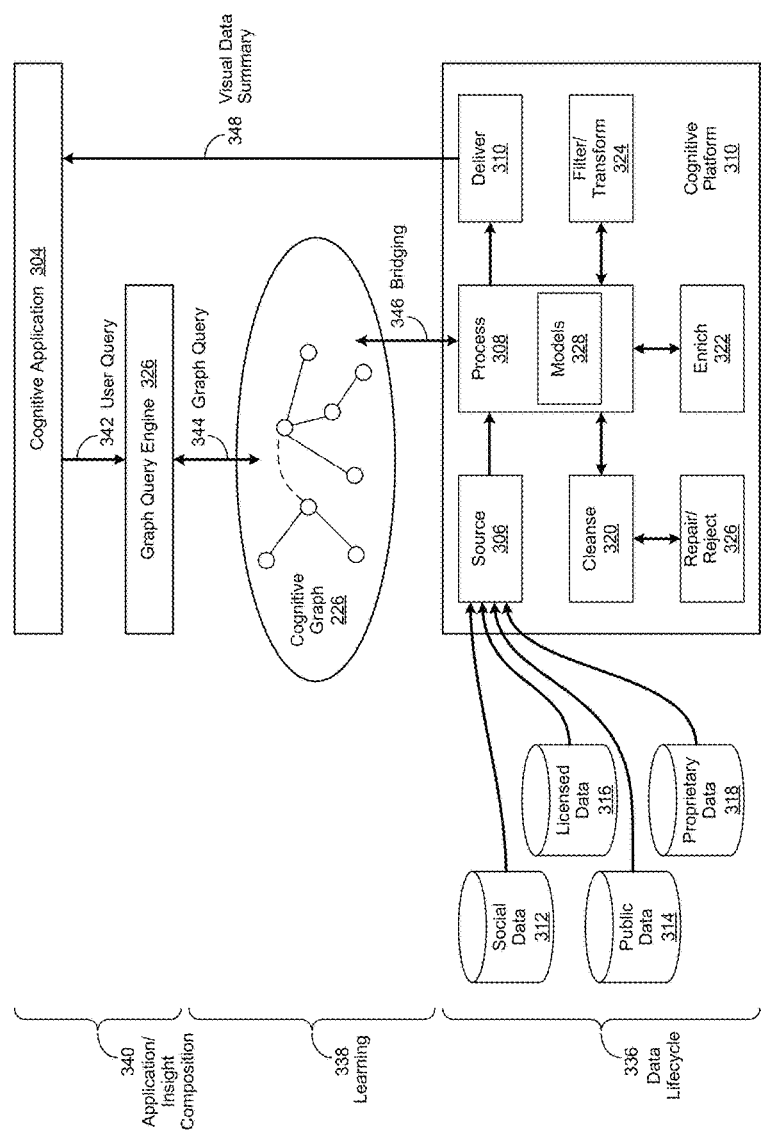
FIG. 3 is a simplified process flow diagram of a cognitive insight generation operations.

FIG. 3 is a simplified process flow diagram of a cognitive insight generation operations performed in accordance with an embodiment of the invention. In various embodiments, cognitive insight operations may be performed in various phases. In this embodiment, these phases include a data lifecycle 340 phase, a learning 338 phase, and an application/insight composition 340 phase.

In the data lifecycle 336 phase, a predetermined cognitive platform 310 instantiation sources social data 312, public data 314, licensed data 316, and proprietary data 318 from various sources. For example, the proprietary data 318 may include privately-owned data, such as an airline's frequent flier information that is only used internally to the airline. In various embodiments, the cognitive platform 310 instantiation includes a CILS, such as the CILS 118 shown in FIGS. 1 and 2. In these and other embodiments, the cognitive platform 310 instantiation includes a source 306 component, a process 308 component, a deliver 310 component, a cleanse 320 component, an enrich 322 component, a filter/transform 324 component, and a repair/reject 326 component. Likewise, as shown in FIG. 3, the process 308 component includes a repository of models 328. As used herein, models 328 broadly refer to machine learning models. In certain embodiments, the models include one or more statistical models.

In various embodiments, the process 308 component is implemented to perform various cognitive insight generation and other processing operations. In these embodiments, the process 308 component is implemented to interact with the source 306 component, which in turn is implemented to perform various data sourcing operations familiar to those of skill in the art. In various embodiments, the sourcing operations are performed by one or more sourcing agents. In these embodiments, the sourcing agents are implemented to source a variety of multi-site, multi-structured source streams of data. In certain embodiments, the sourcing agents may include a batch upload agent, an Application Program Interface (API) connectors agent, a real-time streams agent, a Structured Query Language (SQL)/Not Only SQL (NoSQL) databases agent, a message engines agent, and one or more custom sourcing agents. Skilled practitioners of the art will realize that other types of sourcing agents may be used in various embodiments and the foregoing is not intended to limit the spirit, scope or intent of the invention.

The resulting sourced data is then provided to the process 308 component. In turn, the process 308 component is implemented to interact with the cleanse 320 component, which in turn is implemented to perform various data cleansing operations familiar to those of skill in the art. As an example, the cleanse 320 component may perform data normalization or pruning operations, likewise known to skilled practitioners of the art. In certain embodiments, the cleanse 320 component may be implemented to interact with the repair/reject 326 component, which in turn is implemented to perform various data repair or data rejection operations known to those of skill in the art.

Once data cleansing, repair and rejection operations are completed, the process 308 component is implemented to interact with the enrich 322 component, which is implemented to perform various data enrichment operations familiar to those of skill in the art. As an example, a data stream may be sourced from Associated Press® by a sourcing agent. The enrich 322 component may then enrich the data stream by performing sentiment analysis, geotagging, and entity detection operations to generate an enriched data stream. In certain embodiments, the enrichment operations may include filtering operations familiar to skilled practitioners of the art. To further the preceding example, the Associated Press® data stream may be filtered by a predetermined geography attribute to generate an enriched data stream.

Once data enrichment operations have been completed, the process 308 component is likewise implemented to interact with the filter/transform 324, which in turn is implemented to perform data filtering and transformation operations familiar to those of skill in the art. In various embodiments, the process 308 component is implemented to generate various models, described in greater detail herein, which are stored in the repository of models 328. The process 308 component is likewise implemented in various embodiments use the sourced data to generate one or more cognitive graphs 226, as described in greater detail herein. In various embodiments, the process 308 component is implemented to gain an understanding of the data sourced from the sources of social data 312, public data 314, licensed data 316, and proprietary data 318, which assist in the automated generation of the cognitive graph 226.

The process 308 component is likewise implemented in various embodiments to perform bridging 346 operations. In these and other embodiments, the bridging 346 operations may be performed to provide domain-specific responses when bridging a translated query to a cognitive graph. For example, the same query bridged to a target cognitive graph 226 may result in different answers for different domains, dependent upon domain-specific bridging operations performed to access the cognitive graph 226.

In certain embodiments, the bridging 346 operations are performed by bridging agents. In these embodiments, the bridging agent interprets a translated query generated by the user query 342 within a predetermined user context, and then maps it to predetermined nodes and links within a target cognitive graph 226. In various embodiments, the cognitive graph 226 is accessed by the process 308 component during the learning 336 phase of the cognitive insight generation operations.

In various embodiments, a cognitive application 304 is implemented to receive user input, such as a user query 342, which is then submitted during the application/insight composition 840 phase to a graph query engine 326. In turn, the graph query engine 326 processes the user query 342 to generate a graph query 344. The graph query 344 is then used to query the cognitive graph 226, which results in the generation of one or more cognitive insights. In various embodiments, the process 308 component is implemented to provide these cognitive insights to the deliver 310, which in turn is implemented to deliver the cognitive insights in the form of a visual data summary 348 to the cognitive application 304. In various embodiments, learning operations are iteratively performed during the learning 338 phase to provide more accurate and useful cognitive insights.

In various embodiments, the cognitive insight generation operations are performed to generate travel-related cognitive insights. In these embodiments the social data 312, public data 314, licensed data 316, and proprietary data 318 sourced from various sources may contain travel-related data. For example, the licensed data 316 may be ticket sale information from Sojurn®, weather data from Weather Underground®, Weather.com®, and so forth. Likewise, public data 314 may be Department of Transportation (DOT), Bureau of Transportation Services (BTS), or on-time arrival information provided by various airlines. Proprietary data 318 may likewise include privately-owned data, such as an airline's frequent flier information that is only used internally to the airline.

In various embodiments, the cognitive platform 310 instantiation is implemented to process this travel-related data, and other associated data, to generate travel-related cognitive insights. In these and other embodiments, the travel-related cognitive insights may be provided to a user as a travel-related suggestion. As an example, a user may provide a travel-related user query 342 to a travel website, such as TripAdvisor.com®. In this example, the cognitive insight generation operations are performed to provide an enhanced cognitive search of the travel website to find a preferred destination, for a specific time frame, for the user. To extend the example, the travel-related user query 342 may not be in the form of a traditional query. Instead, the user may submit a statement, such as, "I want to go on a vacation with my family, to the beach, in Florida, in July." or possibly, "I want to go to Utah in May on a mountain biking trip." To extend the example further, the user may also state, "I want to use my frequent flier miles for airline travel and my awards program points for my accommodations."

In various embodiments, a user query 342 that includes such statements is processed by the graph query engine 326 to generate one or more travel-related graph queries 344. In these embodiments, these travel-related graph queries 344 are implemented to understand concepts like destinations, travel-related activities, and purpose of travel. Examples of such concepts include the difference between a honeymoon and a business trip, time frames that are related to travel (e.g., flight segments, time zones, etc.), and various recreational venues.

The resulting graph queries 344 are then used to query a travel-related instantiation of the cognitive graph 226, which in turn results in the generation of one or more travel-related cognitive insights. In certain instances of these embodiments, the cognitive graph 226 contains travel-related data, such as locations, hotels, prices, promotions, and so forth. In various embodiments, the deliver 310 component is implemented to provide the travel-related cognitive insights in the form of a visual data summary 348. As an example, the visual data summary 348 may be provided to the user as a travel review. In various embodiments, the visual data summary 348 may be provided to a predetermined destination associated with the user. In these embodiments, the destination may be a mobile application, an alert, a business intelligence application, a statistical tool, a third party application, a marketplace, or an API.

Figure 4:
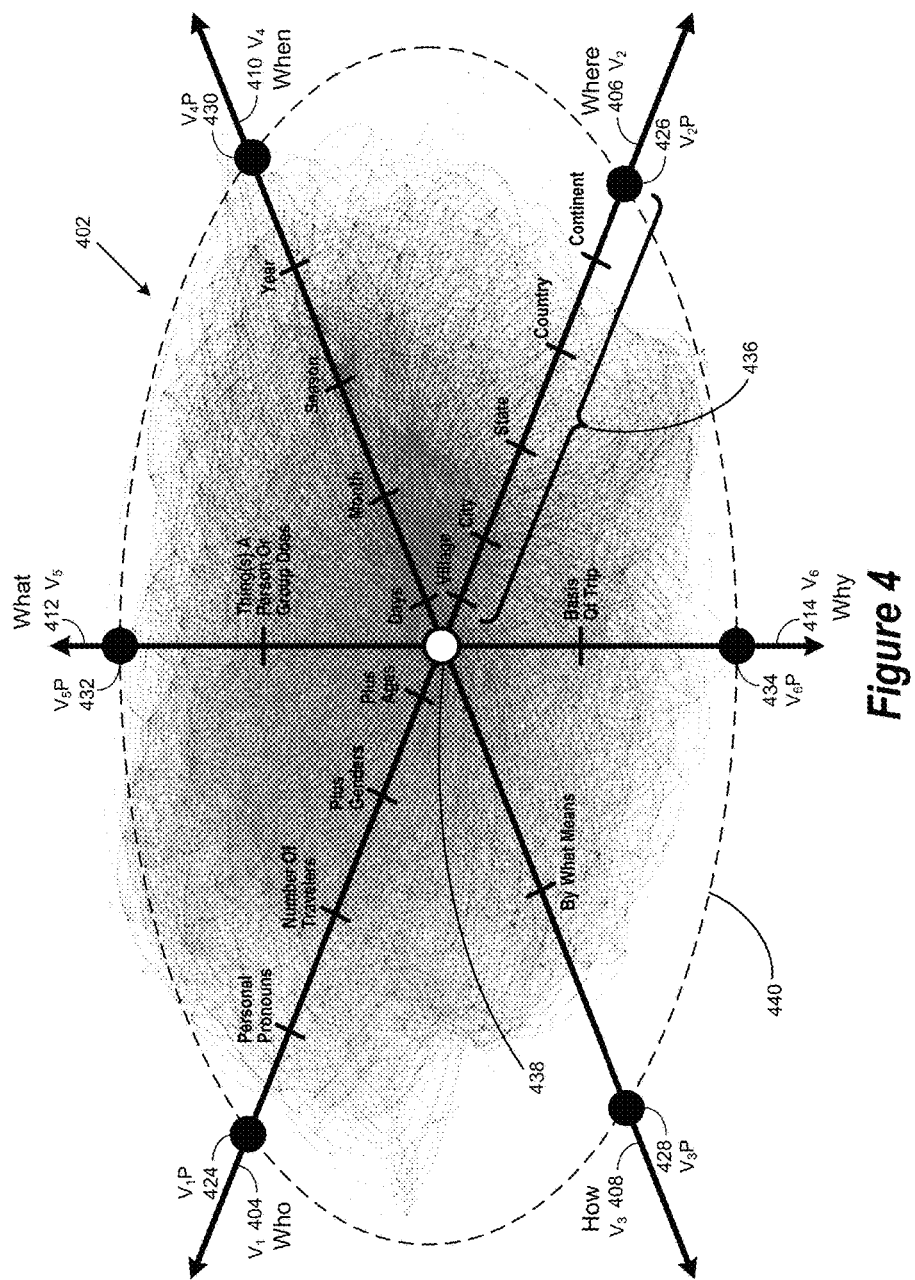
FIG. 4 shows a cognitive cloud defined by a plurality of travel-related cognitive graph (CG) vectors.

FIG. 4 shows a cognitive cloud defined by a plurality of travel-related CG vectors implemented in accordance with an embodiment of the invention. In various embodiments, the cognitive graph 402 contains travel-related data received from various data sources described in greater detail herein. In this embodiment, the cumulative data domain represented by a cognitive graph 402 is defined by a plurality of travel-related CG vectors $V_1$ "Who" 404, $V_2$ "Where" 406, $V_3$ "How" 408, $V_4$ "When" 410, $V_5$ "What" 412 and $V_6$ "Why" 414, each of which extends from a CG nexus 438. In various embodiments, each of the travel-related CG vectors $V_1$ "Who" 404, $V_2$ "Where" 406, $V_3$ "How" 408, $V_4$ "When" 410, $V_5$ "What" 412 and $V_6$ "Why" 414 is associated with a predetermined set of travel-related data within the cognitive graph 402. As an example, individual nodes within the cognitive graph 402 may represent travelers, locations, modes of transportation, activities and so forth. In these and other embodiments, the cognitive graph 402 may be defined by additional travel-related CG vectors than those shown in FIG. 4. In certain embodiments, the cognitive graph 402 may be defined by fewer travel-related CG vectors than those shown in FIG. 4.

As shown in FIG. 4, each of the travel-related CG vectors $V_1$ "Who" 404, $V_2$ "Where" 406, $V_3$ "How" 408, $V_4$ "When" 410, $V_5$ "What" 412 and $V_6$ "Why" 414 includes a plurality of CG vector indices 436 corresponding to predetermined attributes associated with the data domain represented by the cognitive graph 402. In various embodiments, the magnitude of the CG vector indices 436 is substantially similar. In certain embodiments, the magnitude of the CG vector indices 436 is different.

For example, the CG vector indices 436 associated with the travel-related CG vector $V_1$ "Who" 404 may include personal pronouns, the number of travelers, the genders of individual travelers, and the ages of the individual travelers. Likewise, the CG vector indices 436 associated with the travel-related CG vector $V_2$ "Where" 406 may include continent, country, state, city, and village. To continue the example, the CG vector indices 436 associated with the travel-related CG vector $V_3$ "How" 408 may only include by what means the travel will be accomplished, while the CG vector indices 436 associated with the travel-related CG vector $V_4$ "When" 410 may include year, season, month, and days. Likewise, the CG vector indices 436 respectively associated with travel-related CG vectors $V_5$ "What" 412 and $V_6$ "Why" 414 may only include the basis or purpose of the trip and the thing(s) a person or group may do while on the trip.

In various embodiments, the specificity of the CG vector indices 436 increases as they become more proximate to the CG nexus 438. For example, the CG vector indices 436 of "village" and "continent" associated with the travel-related CG vector $V_2$ "Where" 406 are respectively more and less specific classifications of a location. Skilled practitioners of the art will recognize that many embodiments and examples of the CG vector indices 436 are possible and the foregoing is not intended to limit the spirit, scope or intent of the invention.

In various embodiments, CG vector parameters $V_1P$ 424, $V_2P$ 426, $V_3P$ 428, $V_4P$ 430, $V_5P$ 432 and $V_6P$ 434 correspond to user input values, which are used as described in greater detail herein to generate one or more cognitive insights. In various embodiments, the resulting cognitive insights are provided to a user as a travel-related suggestion. In these embodiments, the selected CG vector parameters $V_1P$ 424, $V_2P$ 426, $V_3P$ 428, $V_4P$ 430, $V_5P$ 432 and $V_6P$ 434 likewise correspond to their respective CG vector indices 436.

In various embodiments, the selected CG vector parameters $V_1P$ 424, $V_2P$ 426, $V_3P$ 428, $V_4P$ 430, $V_5P$ 432 and $V_6P$ 434 define a portion 440 of the cognitive graph 226 used to generate a cognitive insight. As an example, as shown in FIG. 4, the selected CG vector parameters $V_1P$ 424, $V_2P$ 426, $V_3P$ 428, $V_4P$ 430, $V_5P$ 432 and $V_6P$ 434 are at the depicted extremities of their respective travel-related CG vectors $V_1$ "Who" 404, $V_2$ "Where" 406, $V_3$ "How" 408, $V_4$ "When" 410, $V_5$ "What" 412 and $V_6$ "Why" 414. As such, a substantive portion 440 of the cognitive graph 226 is used to generate the cognitive insight.

In various embodiments, the resulting cognitive insight is provided as a travel-related suggestion, which corresponds to the CG nexus 438. In certain embodiments, the CG nexus 438 includes a plurality of travel-related suggestions. In various embodiments, the specificity of the travel-related suggestions may respectively increase or decrease relative to the specificity of the CG nexus 438. In these embodiments, the specificity of the CG nexus 438 corresponds to the selected CG vector parameters $V_1P$ 424, $V_2P$ 426, $V_3P$ 428, $V_4P$ 430, $V_5P$ 432 and $V_6P$ 434.

Figure 5:
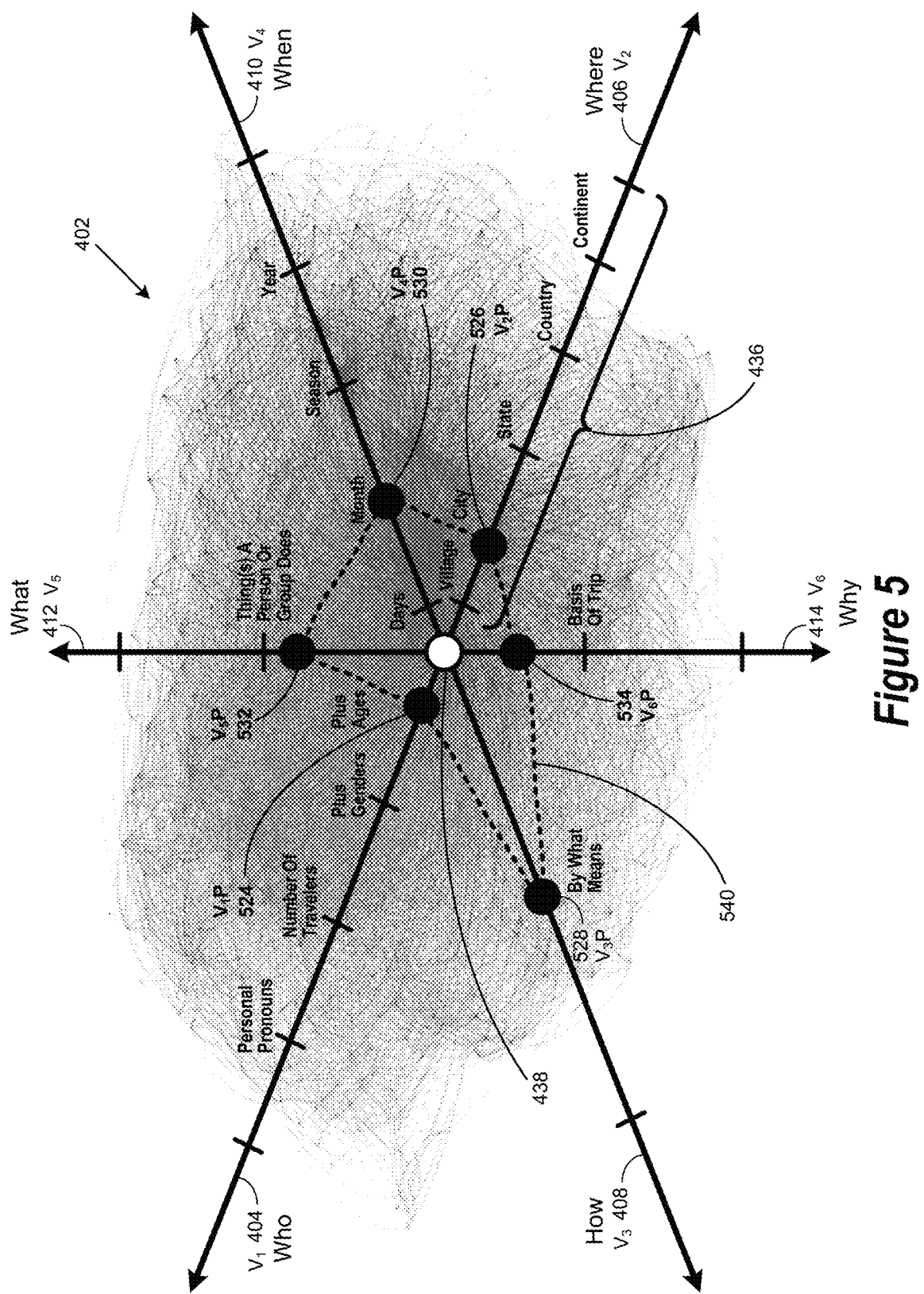
FIG. 5 shows a portion of a cognitive cloud defined by a set of CG vector parameters associated with traveler identity input data.

FIG. 5 shows a portion of a cognitive cloud defined by a set of CG vector parameters associated with traveler identity input data implemented in accordance with an embodiment of the invention. In this embodiment, a statement such as "I want to travel with my 34 year-old wife and my 15 month-old baby boy." is received as traveler identity input data from a user. The travel identity input data is then processed, as described in greater detail herein, to determine the CG vector parameter $V_1P$ 524 associated with the travel-related CG vector $V_1$ "Who" 404. For example, as shown in FIG. 5, the CG vector parameter $V_1P$ 524 corresponds to the number, genders, and ages of the travelers.

In this embodiment, the CG vector parameter $V_1P$ 524 is used to generate initial cognitive insights from travel-related data contained in the cognitive graph 402. For example, the fact that a married couple would be traveling with a young child may imply that travel by air, rail or automobile would be more appropriate than other methods, such as by motorcycle or bicycle. Likewise, it may be inferred that the basis or purpose of the trip would be a vacation, as business travel was not referenced in the travel-related user input. To further the example, it is generally preferable to limit transit times when traveling with young children. As a result, it may be initially inferred that the destination of the trip would be a domestic city instead of an international destination. Likewise, since a specific time was not referenced in the travel-related user input, it may initially be inferred that the travel would take place in months typically associated with family vacations, and by extension, activities typically associated with family vacations.

These initial cognitive insights would then be used to establish the initial values of CG vector parameters $V_2P$ 526, $V_3P$ 528, $V_4P$ 530, $V_5P$ 532 and $V_6P$ 534, which used in conjunction with the CG vector parameter $V_1P$ 524 would define a portion of the cognitive cloud 402. This portion of the cognitive cloud 402 would then be used to generate additional cognitive insights, such as travel-related suggestions. In various embodiments, the provision of such travel-related suggestions to a user may result in the provision of additional travel-related user input. In these embodiments, the additional travel-related user input is processed to generate additional cognitive insights, which in turn are used to iteratively adjust the CG vector parameters $V_1P$ 424, $V_2P$ 426, $V_3P$ 428, $V_4P$ 430, $V_5P$ 432 and $V_6P$ 434 accordingly. Those of skill in the art will recognize that the iterative adjustment of the CG vector parameters $V_1P$ 424, $V_2P$ 426, $V_3P$ 428, $V_4P$ 430, $V_5P$ 432 and $V_6P$ 434 will redefine the portion of the cognitive cloud 402 used to generate subsequent cognitive insights, such as travel-related suggestions for a family vacation.

Figure 6:
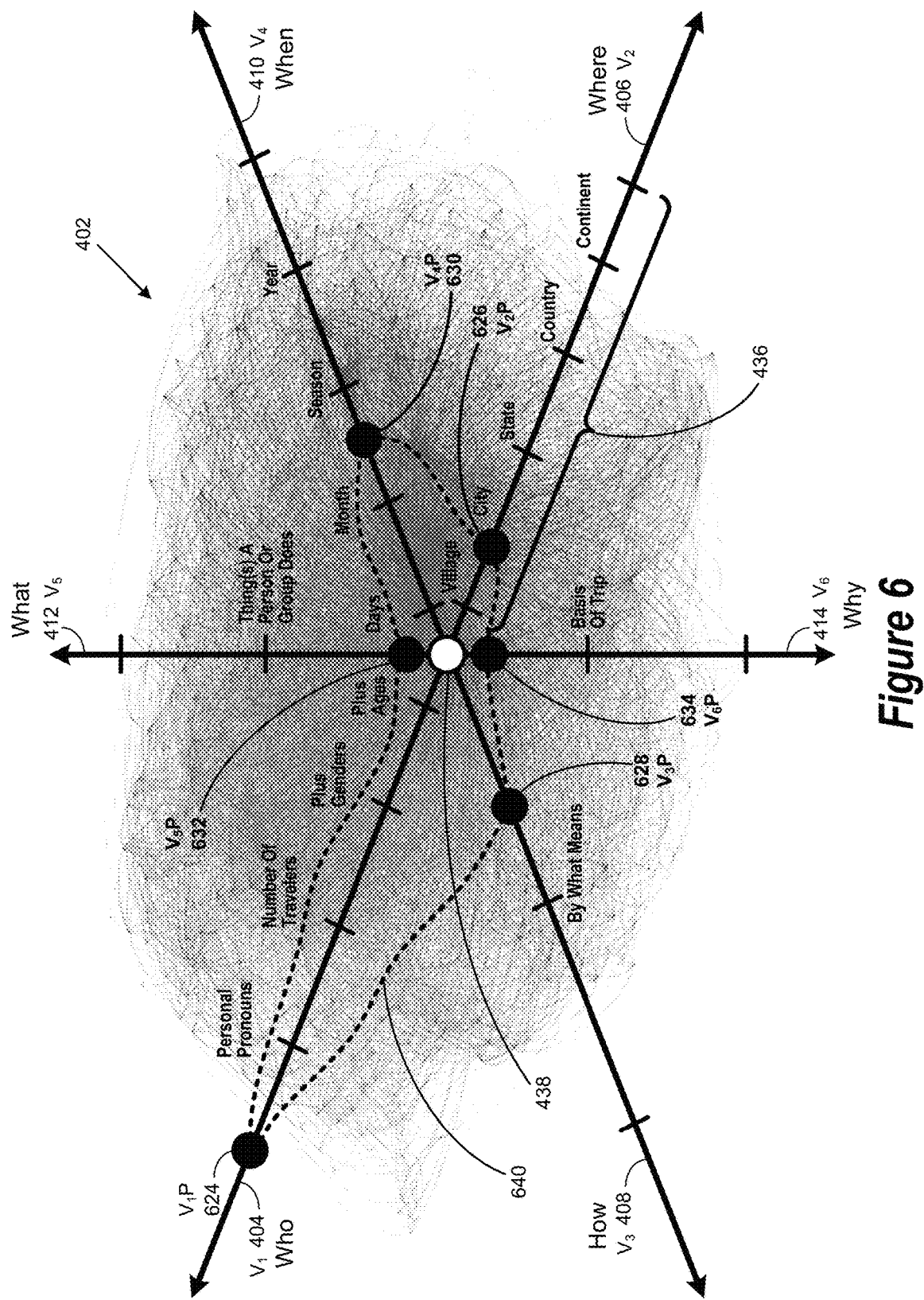
FIG. 6 shows a portion of a cognitive cloud defined by a set of CG vector parameters associated with travel purpose input data.

FIG. 6 shows a portion of a cognitive cloud defined by a set of CG vector parameters associated with travel purpose input data implemented in accordance with an embodiment of the invention. In this embodiment, a statement such as "I want to take a ski trip." is received as travel purpose input data from a user. The travel purpose input data is then processed, as described in greater detail herein, to determine the CG vector parameter $V_5P$ 632 associated with the travel-related CG vector $V_5$ "What" 412. For example, as shown in FIG. 6, the CG vector parameter $V_5P$ 632 is proximate to the CG nexus 438, indicating that the activity of skiing had greater degree of specificity that a more general activity, such as sightseeing or shopping.

In this embodiment, the CG vector parameter $V_5P$ 632 is used to generate initial cognitive insights from travel-related data contained in the cognitive graph 402. For example, the fact that skiing is the purpose of the trip may imply that travel by air, combined with a shuttle service to a ski resort, may take less time and be more convenient than other methods of transportation, such as by automobile, which may be impeded by inclement weather. Furthermore, skiing is typically only possible during certain months of the year, which assists in making an inference associated with which months of the year are best suited for ski trips. Likewise, it can be inferred that skiing is the primary activity during the trip, further reinforcing the inference that lodging at a ski resort may be appropriate. Further, since ski resorts are typically located within driving range of a city, it can be inferred that an initial destination would be a city, especially if the city had an airport. Conversely, it is difficult to infer from the travel-related input statement the identity of the user, the number of travelers, or their respective genders or ages.

These initial cognitive insights would then be used to establish the initial values of CG vector parameters $V_1P$ 624, $V_2P$ 626, $V_3P$ 628, $V_4P$ 630 and $V_6P$ 634, which used in conjunction with the CG vector parameter $V_5P$ 632 would define a portion of the cognitive cloud 402. This portion of the cognitive cloud 402 would then be used to generate additional cognitive insights, such as travel-related suggestions for a ski trip.

Figure 7:
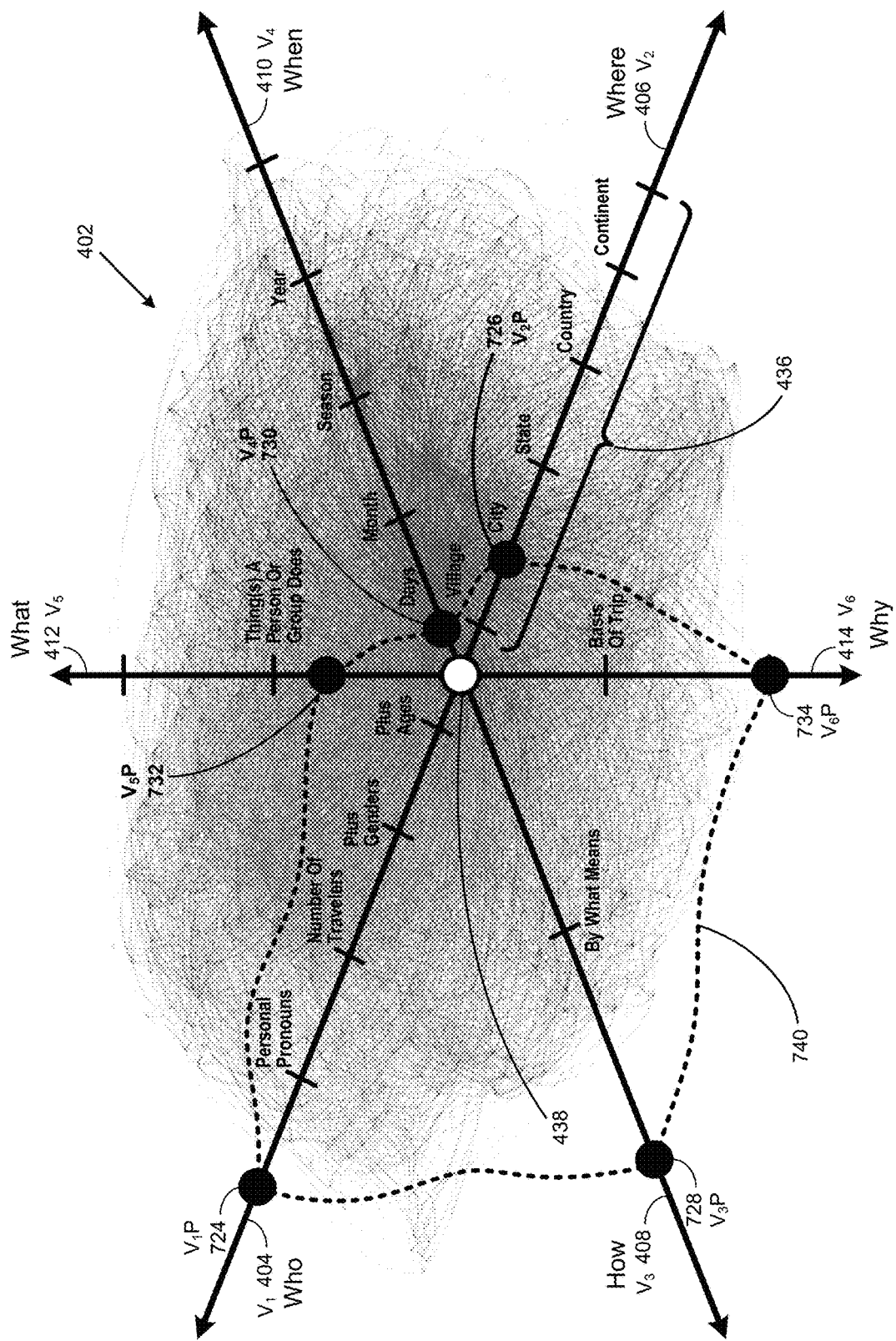
FIG. 7 shows a portion of a cognitive cloud defined by a set of CG vector parameters associated with travel date input data.

FIG. 7 shows a portion of a cognitive cloud defined by a set of CG vector parameters associated with travel date input data implemented in accordance with an embodiment of the invention. In this embodiment, a statement such as "I want to take a trip between July $2^{nd}$ and $20^{th}$." is received as travel date input data from a user. The travel date input data is then processed, as described in greater detail herein, to determine the CG vector parameter $V_4P$ 730 associated with the travel-related CG vector $V_4$ "When" 410. For example, as shown in FIG. 7, the CG vector parameter $V_4P$ 730 is proximate to the CG nexus 438, indicating that the specified dates have a greater degree of specificity that a more general date, such as a month or season.

In this embodiment, the CG vector parameter $V_4P$ 730 is used to generate initial cognitive insights from travel-related data contained in the cognitive graph 402. For example, the specified date range may restrict the possible locations or activities that may be available. To continue the example, a music festival may be scheduled to occur during the specified date range in a predetermined city, which limits the choice of both activities and locations. Furthermore, since identity and other information associated with the user is not available, nor how they wish to travel or why, the initial values of CG vector parameters $V_1P$ 724, $V_3P$ 728 and $V_6P$ 634 are at the extremities of their respective CG vectors $V_1$ "Who" 404, $V_3$ "How" 408 and $V_6$ "Why" 414.

These initial cognitive insights would then be used to establish the initial values of CG vector parameters $V_1P$ 724, $V_2P$ 726, $V_3P$ 728, $V_5P$ 732 and $V_6P$ 734, which used in conjunction with the CG vector parameter $V_4P$ 730 would define a portion of the cognitive cloud 402. This portion of the cognitive cloud 402 would then be used to generate additional cognitive insights, such as travel-related suggestions for a trip during the specified date range.

Figure 8:
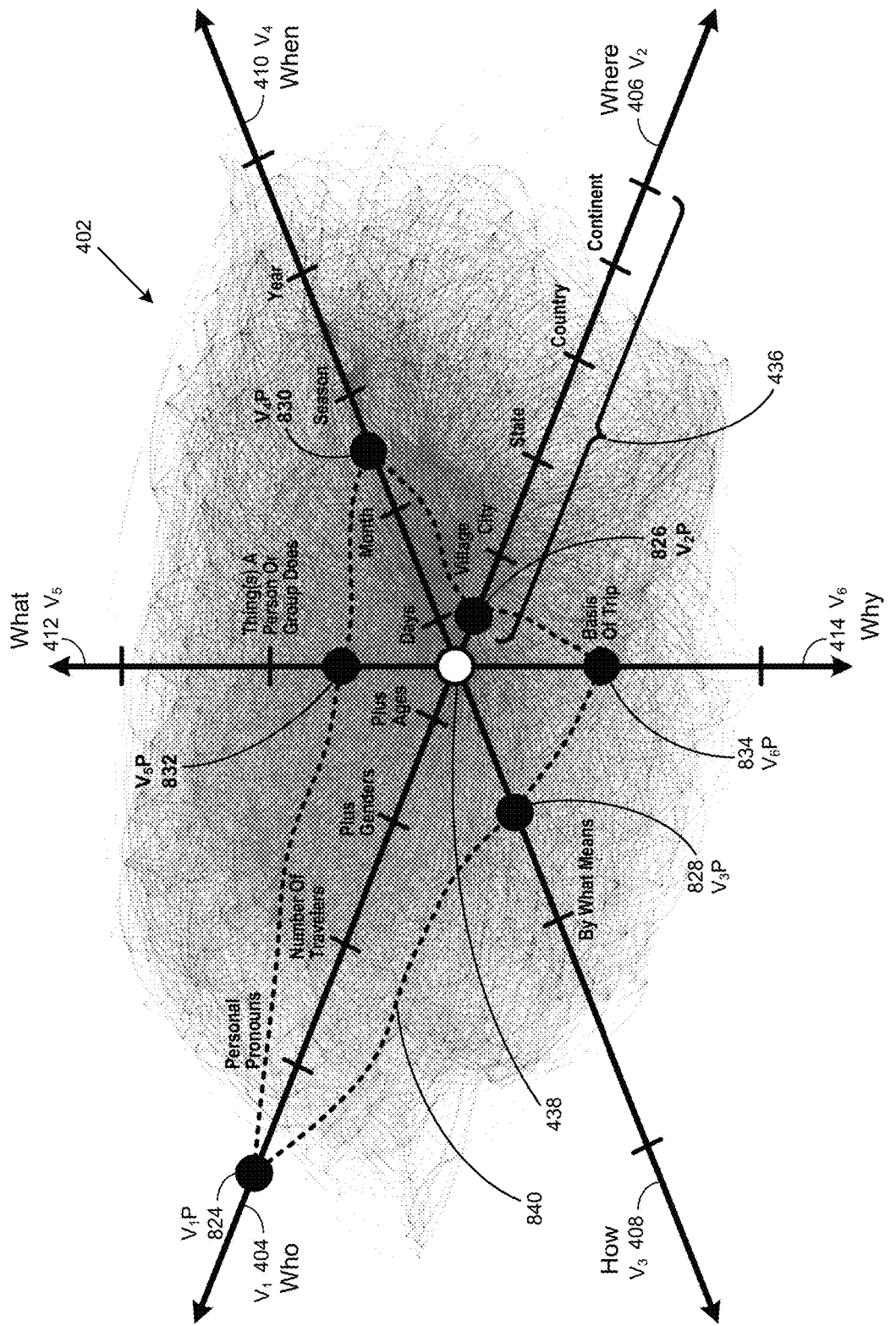
FIG. 8 shows a portion of a cognitive cloud defined by a set of CG vector parameters associated with travel location input data.

FIG. 8 shows a portion of a cognitive cloud defined by a set of CG vector parameters associated with travel location input data implemented in accordance with an embodiment of the invention. In this embodiment, a statement such as "I want to take a trip to Malibu, Calif." is received as travel location input data from a user. The travel location input data is then processed, as described in greater detail herein, to determine the CG vector parameter $V_2P$ 826 associated with the travel-related CG vector $V_2$ "Where" 406. For example, as shown in FIG. 8, the CG vector parameter $V_2P$ 826 is proximate to the CG nexus 438, indicating that the specified location of Malibu has a greater degree of specificity that a more general location, such as a the city of Los Angeles or the state of California.

In this embodiment, the CG vector parameter $V_2P$ 826 is used to generate initial cognitive insights from travel-related data contained in the cognitive graph 402. For example, Malibu has a temperate climate most of the year, so the trip to Malibu could occur in several different months, or even different seasons. Likewise, there are multiple activities spanning a multitude of interests that can be enjoyed in Malibu during those months. Further inferences can be made about the method of travel to Malibu as it may be most easily accessed via automobile or by boat if the traveler is local. For example, the traveler may be traveling from San Diego. However, if the traveler is traveling from out of state, then they may be traveling by air or automobile. Likewise, since Malibu is considered more of a vacation or leisure destination, it can be inferred that the purpose of the trip is more likely for pleasure than business. Furthermore, since the identity and other information associated with the user is not available, the initial values of the CG vector parameter $V_1P$ 824 is at the extremity of the CG vector $V_1$ "Who" 404.

These initial cognitive insights would then be used to establish the initial values of CG vector parameters $V_1P$ 824, $V_3P$ 828, $V_4P$ 830, $V_5P$ 832 and $V_6P$ 834, which used in conjunction with the CG vector parameter $V_2P$ 826 would define a portion of the cognitive cloud 402. This portion of the cognitive cloud 402 would then be used to generate additional cognitive insights, such as travel-related suggestions for a trip to Malibu, Calif.

Figure 9:
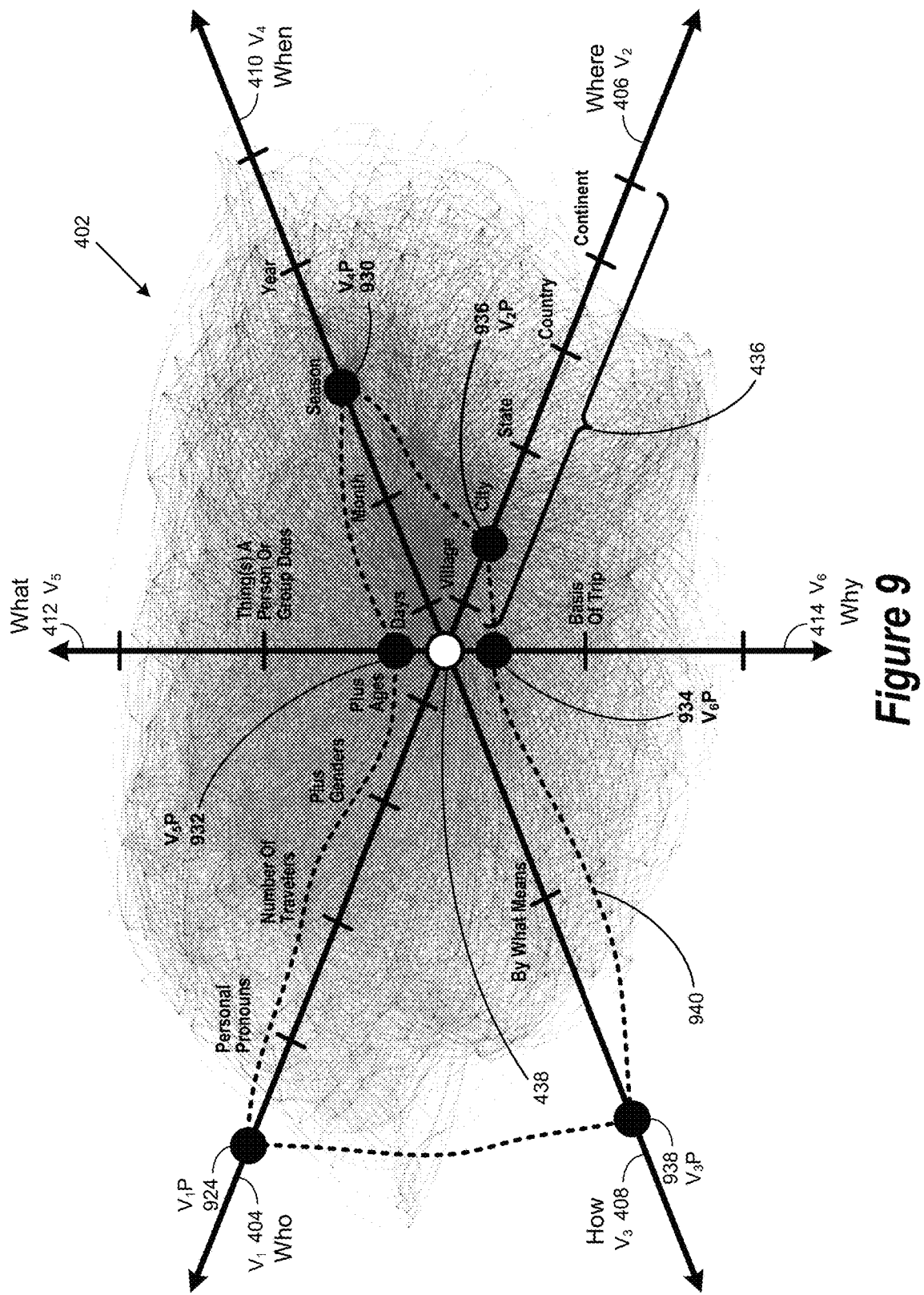
FIG. 9 shows a portion of a cognitive cloud defined by a set of CG vector parameters associated with travel reason input data.

FIG. 9 shows a portion of a cognitive cloud defined by a set of CG vector parameters associated with travel reason input data implemented in accordance with an embodiment of the invention. In this embodiment, a statement such as "I want to take a romantic getaway." is received as travel reason input data from a user. The travel reason input data is then processed, as described in greater detail herein, to determine the CG vector parameter $V_6P$ 934 associated with the travel-related CG vector $V_6$ "Why" 414. For example, as shown in FIG. 9, the CG vector parameter $V_6P$ 934 is proximate to the CG nexus 438, indicating that the specified reason for the travel has a greater degree of specificity than a more general reason, such as sightseeing.

In this embodiment, the CG vector parameter $V_6P$ 934 is used to generate initial cognitive insights from travel-related data contained in the cognitive graph 402. For example, the specified reason for the trip may restrict the possible locations or activities that may be available. To further the example, a location such as a seaside resort may be considered more romantic than a large city. Likewise, a quaint bed and breakfast may be considered more suitable lodging for a romantic getaway than a luxury hotel with hundreds of rooms. Further, certain activities, such as horseback rides on a beach, may be considered more romantic than visiting a natural history museum. Likewise, romantic activities are typically associated with certain seasons instead of particular days, months or years. However, as shown in FIG. 9, the identity and other information associated with the user is not available, nor how they wish to travel. As a result, the initial values of CG vector parameters $V_1P$ 924 and $V_3P$ 928 are at the extremities of their respective CG vectors $V_1$ "Who" 404 and $V_3$ "How" 408.

These initial cognitive insights would then be used to establish the initial values of CG vector parameters $V_1P$ 924, $V_2P$ 926, $V_3P$ 928, $V_4P$ 930 and $V_5P$ 932, which used in conjunction with the CG vector parameter $V_6P$ 934 would define a portion of the cognitive cloud 402. This portion of the cognitive cloud 402 would then be used to generate additional cognitive insights, such as travel-related suggestions for a romantic getaway trip.

Figure 10:
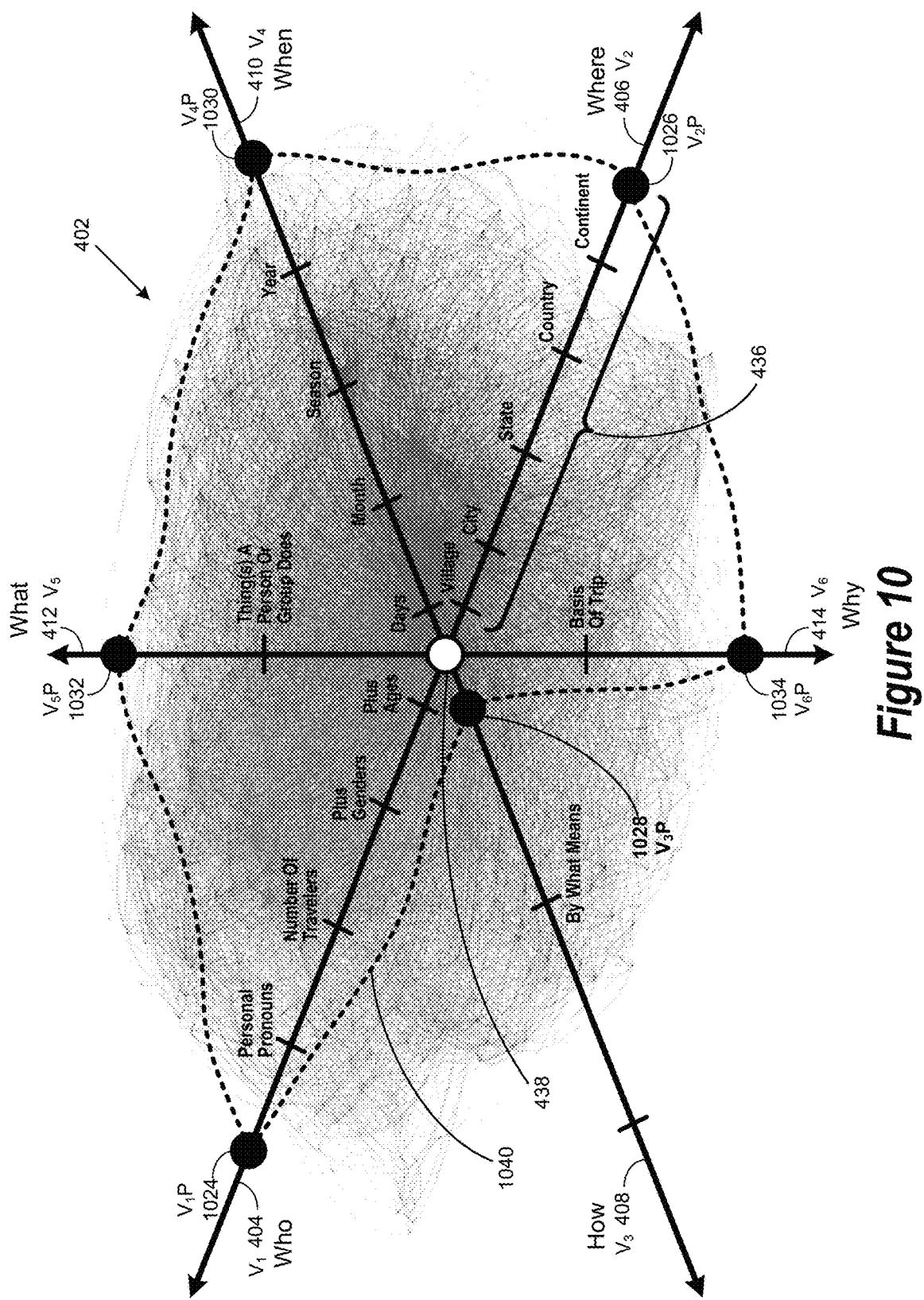
FIG. 10 shows a portion of a cognitive cloud defined by a set of CG vector parameters associated with travel transport input data.

FIG. 10 shows a portion of a cognitive cloud defined by a set of CG vector parameters associated with travel transport input data implemented in accordance with an embodiment of the invention. In this embodiment, a statement such as "I only want to travel by air." is received as travel transport input data from a user. The travel transport input data is then processed, as described in greater detail herein, to determine the CG vector parameter $V_3P$ 1028 associated with the travel-related CG vector $V_3$ "How" 408. For example, as shown in FIG. 10, the CG vector parameter $V_3P$ 1028 is proximate to the CG nexus 438, indicating that limiting travel transport to air travel has a greater degree of specificity than a more general specification, such as not specifying a particular mode of transportation.

In this embodiment, the CG vector parameter $V_3P$ 1028 is used to generate initial cognitive insights from travel-related data contained in the cognitive graph 402. However, limiting travel transport to air travel results in a reduced number of travel-related cognitive insights, depicted by the initial values of CG vector parameters $V_1P$ 1024, $V_2P$ 1026, $V_4P$ 1030, $V_5P$ 1032 and $V_6P$ 1034 being at the extremities of their respective CG vectors $V_1$ "Who" 404, $V_2$ "Where" 406, $V_4$ "When" 410, $V_5$ "What" 412 and $V_6$ "Why" 414. These initial CG vector parameter values, in conjunction with the previously established CG vector parameter $V_6P$ 1034, would define a portion of the cognitive cloud 402 used to generate additional cognitive insights, such as travel-related suggestions for a traveling by air travel.

Although the present invention has been described in detail, it should be understood that various changes, substitutions and alterations can be made hereto without departing from the spirit and scope of the invention as defined by the appended claims.

What is claimed is:

1. A system comprising:
   a processor;
   a data bus coupled to the processor; and
   a computer-usable medium embodying computer program code, the computer-usable medium being coupled to the data bus, the computer program code used for refining cognitive insights using cognitive graph vectors and comprising instructions executable by the processor and configured for:
   storing travel-related data from a plurality of data sources within a cognitive graph;
   associating a first set of the travel-related data within the cognitive graph with a first travel-related cognitive graph vector of a plurality of travel-related cognitive graph vectors;
   associating a second set of the travel-related data within the cognitive graph with a second travel-related cognitive graph vector of the plurality of travel-related cognitive graph vectors;
   processing the travel-related data from the plurality of data sources to provide travel-related cognitive insights; and
   refining the travel-related cognitive insights based upon a limitation relating to one of the plurality of travel-related cognitive graph vectors.

2. A system comprising:
   a processor;
   a data bus coupled to the processor; and
   a computer-usable medium embodying computer program code, the computer-usable medium being coupled to the data bus, the computer program code used for refining cognitive insights using cognitive graph vectors and comprising instructions executable by the processor and configured for:

storing travel-related data from a plurality of data sources within a cognitive graph;

associating a first set of the travel-related data within the cognitive graph with a first travel-related cognitive graph vector of a plurality of travel-related cognitive graph vectors, the first travel-related cognitive graph vector comprising a plurality of first cognitive graph vector indices extending along the first cognitive graph vector away from a cognitive graph nexus;

associating a second set of the travel-related data within the cognitive graph with a second travel-related cognitive graph vector of the plurality of travel-related cognitive graph vectors, the second travel-related cognitive graph vector comprising a plurality of second cognitive graph vector indices extending along the second travel-related cognitive graph vector away from the cognitive graph nexus;

processing the travel-related data from the plurality of data sources to provide travel-related cognitive insights; and refining the travel-related cognitive insights based upon a limitation relating to one of the plurality of travel-related cognitive graph vectors, wherein the limitation comprises limiting the first set of travel-related data to travel-related data within a first certain index of the plurality of first cognitive graph vector indices and the refining comprises limiting the second set of travel-related data to travel-related data within a second certain index of the second cognitive graph vector indices.

3. The system of claim 2, further comprising:

associating a third set of travel-related data within the cognitive graph with a third travel-related cognitive graph vector of the plurality of travel-related cognitive graph vectors; and, wherein the refining of the travel-related cognitive insights based upon the limitation relating to one of the plurality of travel-related cognitive graph vectors further comprises identifying a limitation on one of the first, second and third travel-related cognitive graph vectors and refining another of the first, second and third travel-related cognitive graph vectors based upon the limitation of one of the first, second and third cognitive travel-related graph vectors.

4. The system of claim 3, wherein:

the first travel-related cognitive graph vector comprises a plurality of first cognitive graph vector indices extending along the first travel-related cognitive graph vector away from a cognitive graph nexus;

the second travel-related cognitive graph vector comprises a plurality of second cognitive graph vector indices extending along the second travel-related cognitive graph vector away from the cognitive graph nexus;

the third travel-related cognitive graph vector comprises a plurality of third cognitive graph vector indices extending along the third travel-related cognitive graph vector away from the cognitive graph nexus;

the refining comprising limiting the second set of travel-related data to travel-related data within a second certain index of the second cognitive graph vector indices and travel-related data within a third set of travel-related data; and the refining further comprising limiting the third set of travel-related data to travel-related data within a third certain index of the third cognitive graph vector indices.

5. The system of claim 4, wherein:

at least some of the first cognitive graph vector indices, second cognitive graph vector indices and third vector graph indices are different magnitudes.

6. The system of claim 5, wherein:

at least some of the first cognitive graph vector indices, second cognitive graph vector indices and third vector graph indices are substantially similar magnitudes.

7. A non-transitory, computer-readable storage medium embodying computer program code, the computer program code comprising computer executable instructions configured for:

storing travel-related data from a plurality of data sources within a cognitive graph;

associating a first set of the travel-related data within the cognitive graph with a first travel-related cognitive graph vector of a plurality of travel-related cognitive graph vectors;

associating a second set of the travel-related data within the cognitive graph with a second travel-related cognitive graph vector of the plurality of travel-related cognitive graph vectors;

processing the travel-related data from the plurality of data sources to provide travel-related cognitive insights; and refining the travel-related cognitive insights based upon a limitation relating to one of the plurality of travel-related cognitive graph vectors.

8. A non-transitory, computer-readable storage medium embodying computer program code, the computer program code comprising computer executable instructions configured for:

storing travel-related data from a plurality of data sources within a cognitive graph;

associating a first set of the travel-related data within the cognitive graph with a first travel-related cognitive graph vector of a plurality of travel-related cognitive graph vectors, the first travel-related cognitive graph vector comprising a plurality of first cognitive graph vector indices extending along the first travel-related cognitive graph vector away from a cognitive graph nexus;

associating a second set of the travel-related data within the cognitive graph with a second travel-related cognitive graph vector of the plurality of travel-related cognitive graph vectors, the second travel-related cognitive graph vector comprising a plurality of second cognitive graph vector indices extending along the second travel-related cognitive graph vector away from the cognitive graph nexus;

processing the travel-related data from the plurality of data sources to provide travel-related cognitive insights; and refining the travel-related cognitive insights based upon a limitation relating to one of the plurality of travel-related cognitive graph vectors, wherein the limitation comprises limiting the first set of travel-related data to travel-related data within a first certain index of the plurality of first cognitive graph vector indices and the refining comprises limiting the second set of travel-related data to travel-related data within a second certain index of the second cognitive graph vector indices.

9. The non-transitory, computer-readable storage medium of claim 8, further comprising:
associating a third set of travel-related data within the cognitive graph with a third travel-related cognitive graph vector of the plurality of travel-related cognitive graph vectors; and, wherein
the refining of the travel-related cognitive insights based upon the limitation relating to one of the plurality of travel-related cognitive graph vectors further comprises identifying a limitation on one of the first, second and third travel-related cognitive graph vectors and refining another of the first, second and third travel-related cognitive graph vectors based upon the limitation of one of the first, second and third travel-related cognitive graph vectors.

10. The non-transitory, computer-readable storage medium of claim 9, wherein:
the first travel-related cognitive graph vector comprises a plurality of first cognitive graph vector indices extending along the first travel-related cognitive graph vector away from a cognitive graph nexus;
the second travel-related cognitive graph vector comprises a plurality of second cognitive graph vector indices extending along the second travel-related cognitive graph vector away from the cognitive graph nexus;
the third travel-related cognitive graph vector comprises a plurality of third cognitive graph vector indices extending along the third travel-related cognitive graph vector away from the cognitive graph nexus;
the refining comprising limiting the second set of travel-related data to travel-related data within a second certain index of the second cognitive graph vector indices and data within a third set or travel-related data; and
the refining further comprising limiting the third set of travel-related data to travel-related data within a third certain index of the third cognitive graph vector indices.

11. The non-transitory, computer-readable storage medium of claim 10, wherein:
at least some of the first cognitive graph vector indices, second cognitive graph vector indices and third vector graph indices are different magnitudes.

12. The non-transitory, computer-readable storage medium of claim 11, wherein:
at least some of the first cognitive graph vector indices, second cognitive graph vector indices and third vector graph indices are substantially similar magnitudes.

13. The non-transitory, computer-readable storage medium of claim 8, wherein the computer executable instructions are deployable to a client system from a server system at a remote location.

14. The non-transitory, computer-readable storage medium of claim 8, wherein the computer executable instructions are provided by a service provider to a user on an on-demand basis.

15. A method, comprising:
storing travel-related data from a plurality of data sources within a cognitive graph;
associating a first set of the travel-related data within the cognitive graph with a first travel-related cognitive graph vector of a plurality of travel-related cognitive graph vectors, the first travel-related cognitive graph vector comprising a plurality of first cognitive graph vector indices extending along the first travel-related cognitive graph vector away from a cognitive graph nexus;
associating a second set of the travel-related data within the cognitive graph with a second travel-related cognitive graph vector of the plurality of travel-related cognitive graph vectors, the second travel-related cognitive graph vector comprising a plurality of second cognitive graph vector indices extending along the second travel-related cognitive graph vector away from the cognitive graph nexus;
processing the travel-related data from the plurality of data sources to provide travel-related cognitive insights; and
refining the travel-related cognitive insights based upon a limitation relating to one of the plurality of travel-related cognitive graph vectors, wherein the limitation comprises limiting the first set of travel-related data to travel-related data within a first certain index of the plurality of first cognitive graph vector indices and the refining comprises limiting the second set of travel-related data to travel-related data within a second certain index of the second cognitive graph vector indices.

16. The method of claim 15, further comprising:
associating a third set of travel-related data within the cognitive graph with a third travel-related cognitive graph vector of the plurality of travel-related cognitive graph vectors; and, wherein
the refining of the travel-related cognitive insights based upon the limitation relating to one of the plurality of travel-related cognitive graph vectors further comprises identifying a limitation on one of the first, second and third travel-related cognitive graph vectors and refining another of the first, second and third travel-related cognitive graph vectors based upon the limitation of one of the first, second and third travel-related cognitive graph vectors.

17. The method of claim 16, wherein:
the first travel-related cognitive graph vector comprises a plurality of first cognitive graph vector indices extending along the first travel-related cognitive graph vector away from a cognitive graph nexus;
the second travel-related cognitive graph vector comprises a plurality of second cognitive graph vector indices extending along the second travel-related cognitive graph vector away from the cognitive graph nexus;
the third travel-related cognitive graph vector comprises a plurality of third cognitive graph vector indices extending along the third travel-related cognitive graph vector away from the cognitive graph nexus;
the refining comprising limiting the second set of travel-related data to travel-related data within a second certain index of the second cognitive graph vector indices and data within a third set or travel-related data; and
the refining further comprising limiting the third set of travel-related data to travel-related data within a third certain index of the third cognitive graph vector indices.

18. The method of claim 17, wherein:
at least some of the first cognitive graph vector indices, second cognitive graph vector indices and third vector graph indices are different magnitudes.

19. The method of claim 18, wherein:
at least some of the first cognitive graph vector indices, second cognitive graph vector indices and third vector graph indices are substantially similar magnitudes.

\* \* \* \* \*